United States Patent
Nakamura

(10) Patent No.: US 8,006,312 B2
(45) Date of Patent: *Aug. 23, 2011

(54) DATA COMMUNICATIONS SYSTEM, TERMINAL, AND PROGRAM

(75) Inventor: Taiga Nakamura, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 960 days.

This patent is subject to a terminal disclaimer.

(21) Appl. No.: 11/840,982

(22) Filed: Aug. 19, 2007

(65) Prior Publication Data

US 2008/0082676 A1    Apr. 3, 2008

Related U.S. Application Data

(63) Continuation of application No. 10/357,037, filed on Jan. 31, 2003, now Pat. No. 7,278,167.

(30) Foreign Application Priority Data

Feb. 4, 2002    (JP) .................................. 2002-027377

(51) Int. Cl.
*H04L 29/00*    (2006.01)

(52) U.S. Cl. ........................................................ 726/29
(58) Field of Classification Search ..................... 726/29
See application file for complete search history.

(56) References Cited

U.S. PATENT DOCUMENTS

| | | | | |
|---|---|---|---|---|
| 7,024,697 B2 * | 4/2006 | Nitaki | .............................. | 726/26 |
| 7,278,167 B2 * | 10/2007 | Nakamura | ....................... | 726/29 |
| 2008/0082676 A1 * | 4/2008 | Nakamura | ..................... | 709/229 |

* cited by examiner

*Primary Examiner* — Matthew B Smithers
(74) *Attorney, Agent, or Firm* — Vazken Alexanian

(57) ABSTRACT

To provide a system which allows large volumes of data to be exchanged efficiently through network connections using portable terminals. An example data communications system includes a data terminal which stores certain data; and an operation terminal which controls access rights to the data stored in the data terminal, in which the operation terminal grants another operation terminal access rights to desired data. The data terminal returns the data according to an access request made based on the access rights. On the other hand, the operation terminal passes the acquired access rights to the data terminal, which then accesses the data terminal via a high-speed, stable, wired network and acquires the desired data, based on the access rights.

7 Claims, 7 Drawing Sheets

DATA COMMUNICATIONS SYSTEM, TERMINAL, AND PROGRAM

CROSS-REFERENCE TO RELATED APPLICATIONS

This application is a continuation of and claims priority from U.S. application Ser. No. 10/357,037, filed on Jan. 31, 2003, now U.S. Pat. No. 7,278,167, which in turn claims priority under 35 U.S.C. §119 from Japanese Patent Application No. 2002-027377 filed Feb. 4, 2002. The entire contents of U.S. application Ser. No. 10/357,037 and Japanese Patent Application No. 2002-027377 are incorporated herein by reference.

FIELD OF THE INVENTION

The present invention relates to a data communications system for transferring data via a network. More particularly it relates to a system suitable for transferring large volumes of data.

BACKGROUND ART

Recently, applications which use peer-to-peer (P2P) communications without any particular server have been drawing attention even on large networks such as the Internet. Typically, this type of applications include music-content exchange tools such as Napster and Gnutella and various communications tools such as instant messengers.

Also, network connections are now available to PDAs (Personal Digital Assistants), cellular phones, and other portable terminals. Such communications can take various forms, including local communications by means of short-distance wireless communications or infra-red light, indirect Internet connections via telephone company lines, etc.

Communications by means of portable terminals are advantageous in that they allow users to conduct communications and exchange data from anywhere. With the spread of a communications method which allows portable terminals to conduct peer-to-peer communications with each other directly (without a server) and exchange or deliver digital content (hereinafter referred to simply as content) by running an application with peer-to-peer communications capabilities on the portable terminals, it is expected that full-fledged commercial activities will be implemented using this as a platform.

Incidentally, methods of connecting to a network via a portable terminal generally have the following disadvantages because they employ wireless as well as hardware configuration that attaches importance to portability:

relatively unstable communications channels due to the use of wireless;
lower communications speed than wire communication;
lower data storage capacity than information equipment such as personal computers;
lower processing capability than information equipment such as personal computers;
inferior output devices (screen, etc.) compared to those of information equipment such as personal computers; and
necessity to minimize power consumption due to predominant use of battery power (including reduction of power consumption for network connection).

The communications speed, data storage capacity, processing capability, etc. are expected to be improved with advances in technology. However, there are definite differences in capability from a wired network connection between a personal computer or the like and a network.

In commercial activities using network connections based on above described portable terminals, it will be necessary to take the following points into consideration.

It is necessary to transmit content, request transmission of content, etc. on a portable terminal.

It is likely that higher-quality content or higher-priced content than the content currently transferred between portable terminals will become available. In that case, the volumes of main data transmitted and received will generally be fairly large.

When content is traded, it is necessary to clarify its ownership. Generally, it is considered that a user's ownership of content is established at the moment when transfer of the content from the remote end to the user is completed.

However, methods of connecting wirelessly to a network from a portable terminal present the following problems because such methods of connection have the disadvantages described above.

A network connection should be maintained for a long time to transfer a large volume of data. For example, when transferring data via local communication, a connection should be maintained until the communication is completed. This wastes time and battery life.

If it is considered, as described above, that a user's ownership of content is established at the moment when transfer of content from the remote end to the user is completed, the user cannot own data if communication is interrupted halfway through transfer of the data. In the case of unstable wireless communications, such a situation can occur frequently. Also, retransmission of data and other processes will complicate the situation if the communications channel is unstable. Thus, it takes a lot of time and labor to establish the "ownership" of the data.

Portable terminals, whose output device is not provided with high functionality, are not necessarily intended to use high quality data. In other words, although high-quality, high-priced content is expected to be exchanged when commercial activities using portable terminals are implemented, in many cases, the portable terminals themselves are not suitable for utilizing such content directly.

Thus, with network connections using current portable terminals, it is difficult to meet the needs to:

exchange large volumes of data efficiently;
determine content and acquisition methods of data exchanged between portable terminals through peer-to-peer communications;
eliminate the need for portable terminals to maintain a network connection for a long time; and
output only properly processed data to a portable terminal while a large volume of data is received.

SUMMARY OF THE INVENTION

Thus, an aspect of the present invention is to provide methods, apparatus and systems which allows large volumes of content (data) to be exchanged efficiently through network connections using portable terminals.

Another aspect of the present invention is to provide systems which allows large volumes of data to be exchanged without the need for a portable terminal to maintain a network connection for a long time.

Still another aspect of the present invention is to provide systems which can exchange large volumes of data and output data which has been processed properly according to the functionality of the output device.

BRIEF DESCRIPTION OF THE DRAWINGS

These and other aspects, features, and advantages of the present invention will become apparent upon further consideration of the following detailed description of the invention when read in conjunction with the drawing figures, in which.

DESCRIPTION OF SYMBOLS

Figure 1:
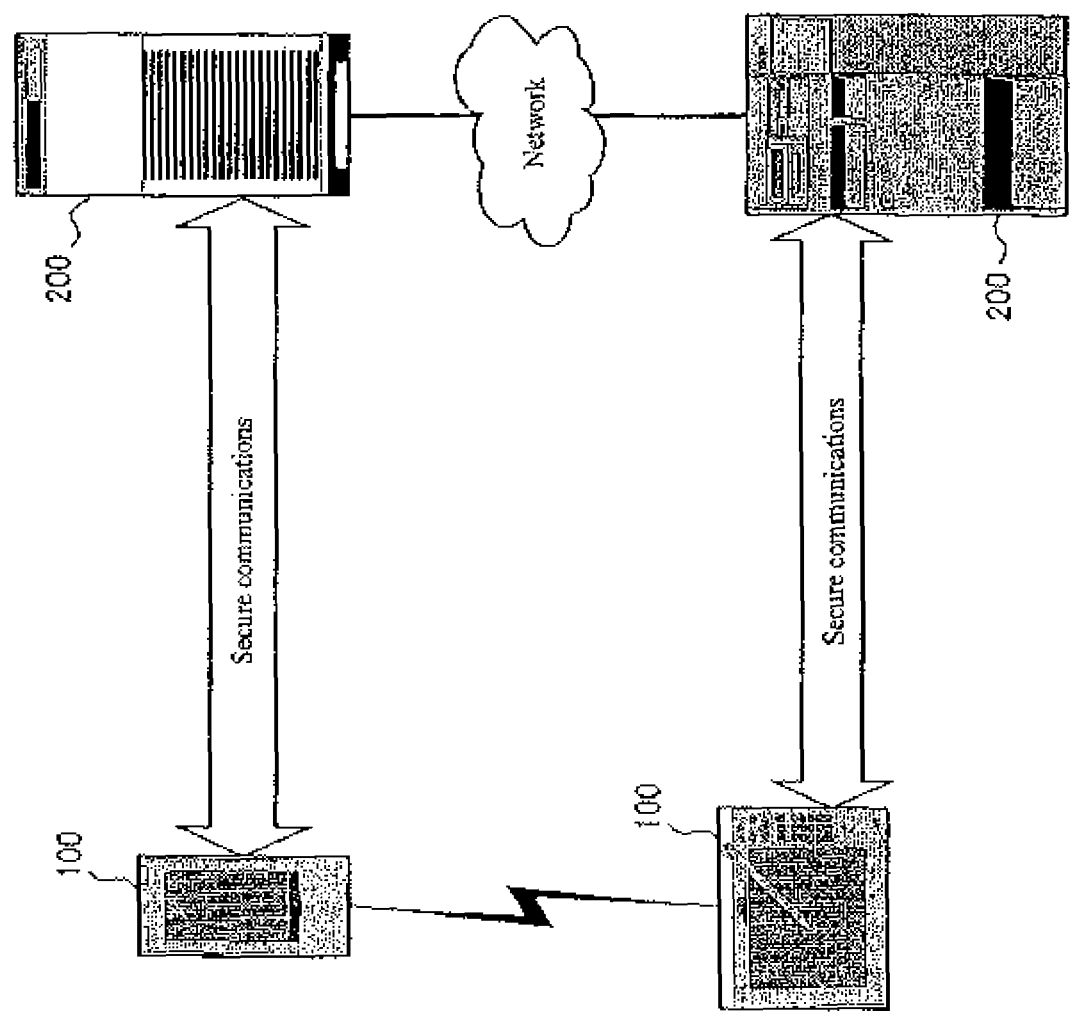
FIG. 1 is a diagram showing an example of a system configuration suitable for implementing a data communications system according to an embodiment of the present invention.

100 . . . Operation terminal
101, 111, 121 . . . Negotiator
102, 122 . . . Token generator
103, 113, 123 . . . Token transmitter
112 . . . Token receiver
114 . . . Data receiver
200 . . . Data terminal
201, 211, 231 . . . Data store
202, 212, 232 . . . Token receiver
203, 217, 227, 233 . . . Controller
204, 215, 234 . . . Data converter
205, 216, 235 . . . Data transmitter
213, 236 . . . Token transmitter
214, 237 . . . Data receiver
300 . . . Certification authority (CA)
400 . . . Server

DESCRIPTION OF THE INVENTION

To achieve the above aspects, the present invention provides a data communications system, comprising: a data storage terminal which stores certain data; and a control terminal which controls access rights to the data stored in the data storage terminal. The control terminal connects to another terminal via a network and grants the other terminal access rights to desired data. The data storage terminal returns the data according to an access request made based on the access rights granted by the control terminal.

The present invention is also implemented as a data communications system, comprising: an operation terminal which makes an arrangement about transfer of data held by a designated terminal and acquires access rights to the data based on the arrangement; and a data acquisition terminal which acquires desired data held by the designated terminal by making a data access request to the designated terminal via a network based on the access rights acquired by the operation terminal.

More specifically, the data acquisition terminal processes the acquired data according to capability of the operation terminal and transmits the processed data to the operation terminal, and the operation terminal receives and uses the data sent from the data acquisition terminal.

In the above data communications systems, it is advantageous that the data storage terminal and data acquisition terminal transmit and receive data via a high-speed, stable, wired network. Also, as a means of setting access rights, a token for gaining access to desired data can be issued.

Another example of a data communications system according to the present invention comprises: an operation terminal which uses content data; and a data supply terminal which supplies the content data to the operation terminal, wherein the operation terminal requests the data supply terminal to acquire content data held by a designated terminal on a network, and the data supply terminal acquires desired content data from the designated terminal in possession of the content data and supplies it to the operation terminal, via the network in response to the acquisition request from the operation terminal.

Furthermore, another aspect of the present invention is implemented as a terminal which conducts data communications via a network, comprising: a communications unit which establishes a connection with another terminal via the network; and an access right granting unit which makes an arrangement via the communications unit about transfer of data held by a designated data storage terminal and grants the other terminal access rights to the data, based on the arrangement.

More specifically, the access right granting unit here comprises: a token generating unit which generates a token for gaining access to the data held by the designated data storage terminal; and a token transmission unit which transmits the token generated by the token generating unit to the other terminal.

The present invention is also implemented as a terminal comprising: an access right acquisition unit which makes an arrangement about transfer of data held by a designated data storage terminal with another terminal via the network and acquires access rights to the data based on the arrangement; and a data acquisition requesting unit which requests a data acquisition terminal accessible to the data storage terminal via a network to acquire the data based on the acquired access rights.

More specifically, the access right acquisition unit acquires a token for gaining access to the data held by the data storage terminal from another terminal; and the data acquisition requesting unit passes the token acquired by the access right acquisition unit to the data acquisition terminal.

Furthermore, the present invention can be implemented as programs which control computers and make them operate as the various terminals described above. These programs can be distributed in a magnetic disk, optical disk, semiconductor memory, or other recording medium, delivered via networks, and provided otherwise.

Besides, the present invention is also implemented as a data communications method, comprising the steps of: making an arrangement via a wireless network about transfer of designated data and assigning access rights to the data, based on the arrangement; and transferring the data between designated terminals over a wired network based on the assigned access rights.

The present invention will be described below with reference to an embodiment shown in the accompanying drawings. FIG. 1 is a diagram showing a system configuration suitable for implementing a data communications system according to this embodiment. In this embodiment, each of users who exchange content (data) has a user system consisting of an operation terminal 100 for carrying out procedures for content exchange and a data terminal 200 for storing and retaining content.

The operation terminal 100 is implemented by a PDA, portable telephone, or other portable terminal. It has a processing unit (CPU) which runs various processes under program control, a memory, communications capabilities, and networking capabilities and can connect to a network via a wireless channel.

The data terminal 200 is implemented by a personal computer, workstation, or other computer. It has a processing unit (CPU) which runs various processes under program control, a memory, communications capabilities, and networking capabilities. It is connected to a network via a wireless channel for communicating with the operation terminal 100 as well as via a high-speed wire channel. It also comprises a easily readable/writable large-capacity storage device such as a magnetic disk device and a processing unit (CPU) which processes data stored in the storage device as required. Furthermore, it may comprise output devices (such as a display) for outputting data stored in the storage device and input devices (such as a keyboard and mouse) for entering data and various commands.

As described above, communication is also possible between the operation terminal 100 and data terminal 200 of a given user. In this communication, to guarantee secure communications, the operation terminal 100 and data terminal 200 are provided with capabilities for mutual authentication as well as capabilities for communicating securely by means of encryption or the like. Any appropriate method may be used for authentication and encryption.

Incidentally, the network used for communications between operation terminals 100, network used for communications between data terminals 200, and network used for communications between an operation terminal 100 and data terminal 200 may be the same or different. For example, whereas it is desirable to use a wide area network such as the Internet for communications between data terminals 200 where content is exchanged among unidentified users, a local network implemented by Bluetooth may be used for communications between operation terminals 100 if users carrying an operation terminal 100 communicate with each other at a short distance.

According to this example embodiment, in the data communications system shown in FIG. 1, access rights to content data stored in the data terminals 200 are specified between operation terminals 100 and the content data is transferred between the data terminals 200 based on the access rights.

Also, according to this embodiment, a token is used as a means of setting the access rights. Specifically, when transferring content stored in a given data terminal 200, the operation terminal 100 for this data terminal 200 issues a token for gaining access to the content data. Then, if an access request is made to the data terminal 200 using this token, the data terminal 200 returns appropriate content data to the access requester, provided the token is valid.

Figure 2:
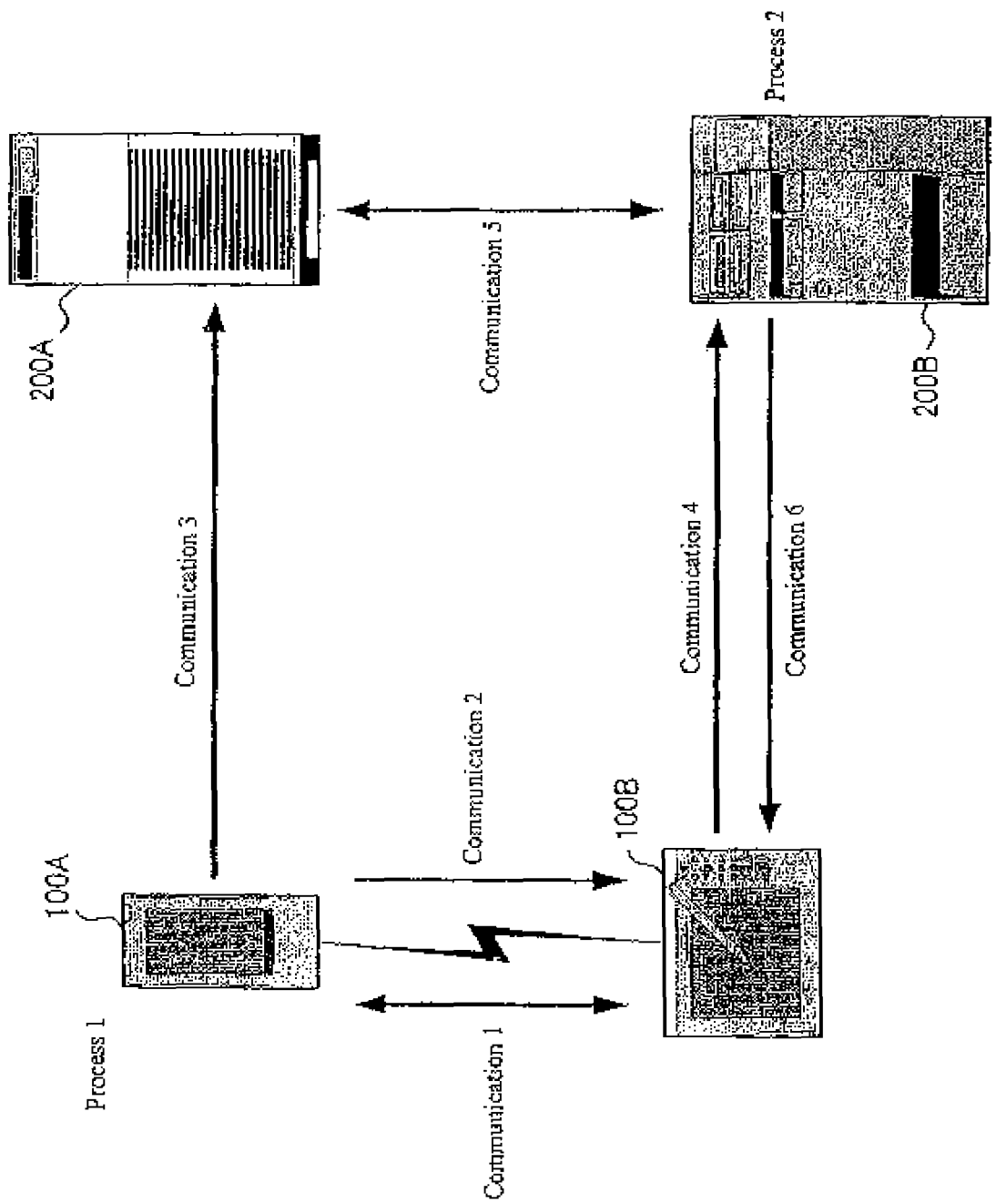
FIG. 2 is a diagram illustrating a data flow and general processing scenario for communications using the operation terminals and data terminals shown in FIG. 1.

FIG. 2 is a diagram illustrating a data flow and general processing scenario for communications using the operation terminals 100 and data terminals 200 shown in FIG. 1. In FIG. 2, User A provides content and User B acquires content from User A. Thus, in the following description, the operation terminal 100 and data terminal 200 of User A is indicated by suffix "A" and the operation terminal 100 and data terminal 200 of User B is indicated by suffix "B," as shown in FIG. 2. It is assumed that the content owned by User A is stored in the data terminal 200A and that User B acquires the content upon transfer of the content to the data terminal 200B. User B uses (views, etc.) the content stored in the data terminal 200B, using the operation terminal 100B.

As shown in FIG. 2, when the intentions of Users A and B to transfer content are confirmed, Users A and B make an arrangement about a method of data transfer, data content format of the data to be transferred, etc. by communicating between the operation terminals 100A and 100B (Communication 1 in FIG. 2). This communication is conducted on a peer-to-peer basis. Since only information related to the arrangement about the data transfer is communicated, the traffic involved here is light enough to be managed by the communications capacities of the operation terminals 100A and 100B.

After the arrangement about the content data transfer is made in Communication 1, a token is generated on the operation terminal 100A in order for User B to acquire the content (Process 1). The token includes information needed to access the data stored in the data terminal 200A. The format of the token can be determined arbitrarily.

The token generated on the operation terminal 100A is transferred to the operation terminal 100B of User B and the data terminal 200A of User A (Communications 2 and 3). Communication 2 between the operation terminals 100A and 100B is conducted on a peer-to-peer basis as in the case of Communication 1. Communication 3 between the operation terminal 100A and data terminal 200A may be conducted on a peer-to-peer basis or on a client-server basis with the data terminal 200A working as a server. Again in Communications 2 and 3, since only the token is transmitted and received, the traffic involved is light enough to be managed by the communications capacities of the operation terminals 100A and 100B. After the token is transferred, there is no need for the operation terminal 100A to maintain the network connection.

Upon receiving the token from the operation terminal 100A, the operation terminal 100B of User B transfers the received token to the data terminal 200B (Communication 4). Again in Communication 4, since only the token is transmitted and received, the traffic involved is light enough to be managed by the communications capacity of the operation terminal 100B. After the token is transferred, there is no need for the operation terminal 100B to maintain the network connection.

The data terminal 200B of User B accesses the data terminal 200A using the token transferred by the operation terminal 100B. After verifying the validity of the received token, the data terminal 200A transmits content data according to the arrangement indicated by the token (Communication 5). The validity of the token is verified through comparison of the token used for access from the data terminal 200B in Communication 5 and the token transferred from the operation terminal 100A in Communication 3.

Communication 5, in which content data itself is transferred, involves high traffic. Therefore, between the data terminals 200A and 200B, data is transferred through a high-speed, stable, wire channel. User B owns the content data at the time when Communication 5 is completed and the content data is stored in the data terminal 200B.

Then, the data terminal 200B processes the acquired content data properly according to the capability (screen size of an output device or storage capacity of a memory) of the operation terminal 100B (Process 2) and transfers it to the operation terminal 100B (Communication 6). In this case, since processed content data smaller in volume than the original content data is transmitted and received, the traffic is lower than when transmitting the original content data.

In view of the above implementation, the operation terminal 100A of User A is a control terminal for controlling the access rights to content data while the data terminal 200A is a data storage terminal for storing the content data provided. On the other hand, the operation terminal 100B of User B is an operation terminal for acquiring data access rights while the data terminal 200B is a data acquisition terminal for acquiring content data based on the access rights acquired by the operation terminal 100B.

Now, the token used in this embodiment will be described further. As described above, the token includes information for gaining access to the content data stored in the data terminal 200A. It also includes information about an arrangement (a method of data transfer, data content and format of the data to be transferred, etc.) made between the operation terminals 100A and 100B about the transfer of content data because this information should be delivered to the data terminals 200A and 200B which actually transfer the content data.

The validity of the token can be verified on the data terminal 200A through comparison of the token transmitted from the operation terminal 100A and the token transmitted from the data terminal 200B, as described above. However, the data included in the two tokens do not need to be identical. For example, cases such as those described below are conceivable.

The token passed from the operation terminal 100A to the data terminal 200A includes temporary account information for User B in addition to the arrangement information about a method of data transfer, data content and format of the data to be transferred, etc. On the other hand, the token passed from the operation terminal 100A to the operation terminal 100B includes only account information. When accessed by the data terminal 200B using the account included in the token, the data terminal 200A authenticates the account by checking it against the account included in the token received from the operation terminal 100A, and then transfers content data according to the arrangement described in the accessed token.

The token passed from the operation terminal 100A to the operation terminal 100B includes, in addition to the arrangement information about a method of data transfer, data content and format of the data to be transferred, etc., a digital signature for certifying validity of the information. When accessed by the data terminal 200B using this token, the data terminal 200A authenticates the digital signature attached to the token, and then transfers content data according to the arrangement described in the token. In this case, since the authentication of the digital signature verifies the validity of the token, there is no need to transfer a token from the operation terminal 100A to the data terminal 200A in Communication 3.

Figure 3:
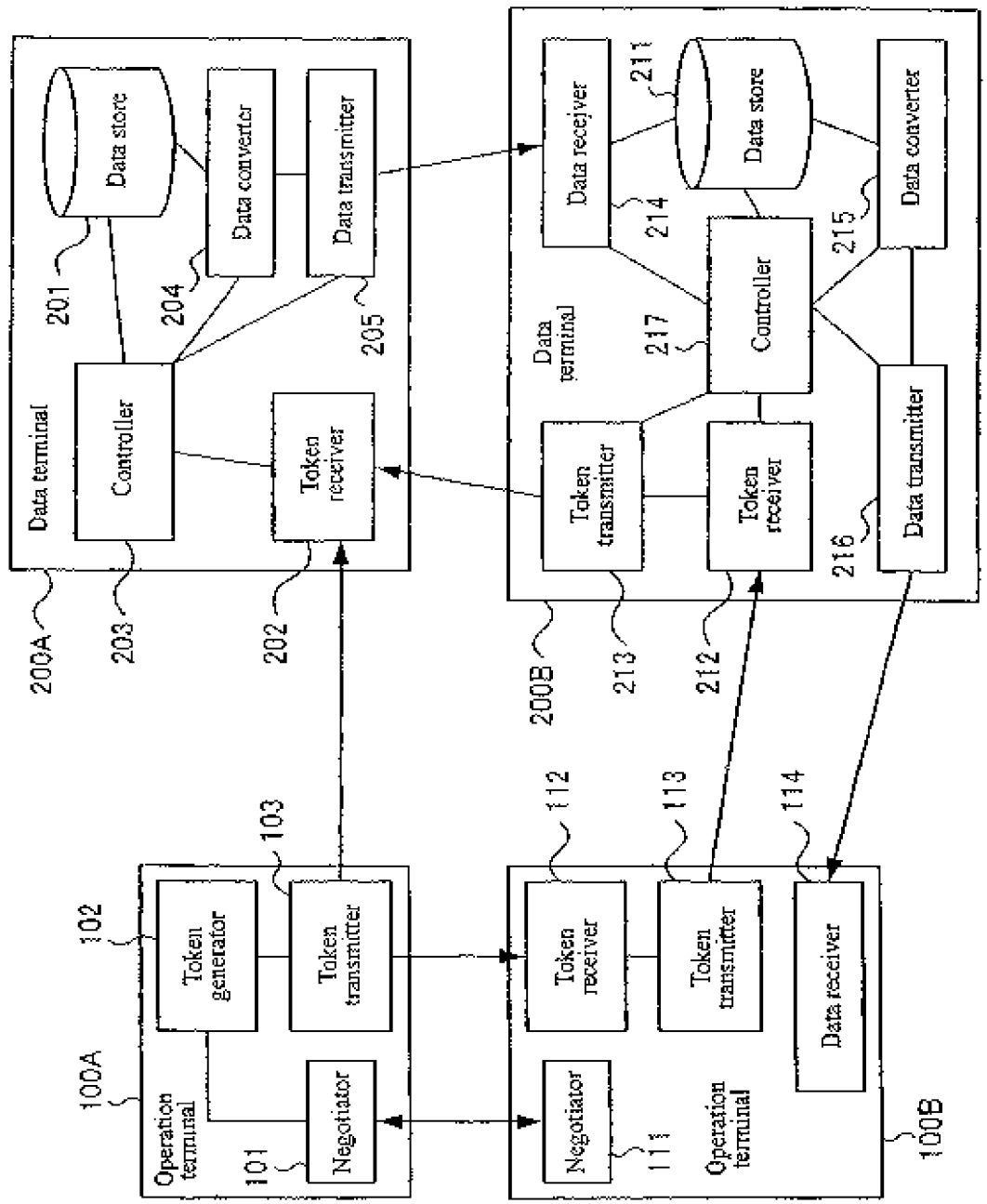
FIG. 3 is a diagram showing configurations of various terminals which implement the data communications system according to this embodiment.

FIG. 3 is a diagram showing configurations of various terminals which implement the data communications system according to this embodiment. Referring to FIG. 3, the User A's operation terminal 100A which provides content data comprises a negotiator 101 for negotiating an arrangement with the User B's operation terminal 100B about transfer of content data, a token generator 102 which generates a token, and a token transmitter 103 which transmits the generated token to the operation terminal 100B and data terminal 200A. The negotiator 101 and token transmitter 103 communicate with the operation terminal 100B or data terminal 200A by controlling communications functions of the operation terminal 100A.

It is noted that the above components are virtual software blocks implemented by program-controlled processing units (CPUs). The programs which control the processing units (CPUs) can be distributed in a recording medium such as a magnetic disk or semiconductor memory, delivered via networks, and provided otherwise. The functions of the above components are implemented as the processing units are controlled by the programs read into a memory installed on the operation terminal 100A.

The data terminal 200A of User A comprises a data store 201 which stores content data, a token receiver 202 which receives tokens from the operation terminal 100A and data terminal 200B, a controller 203 which verifies the validity of the received tokens and controls transmission of content data according to the arrangement described in the tokens, and a data converter 204 and data transmitter 205 which read desired data from the data store 201 and transmit it to the data terminal 200B under the control of the controller 203. The token receiver 202 and data transmitter 205 communicate with the operation terminal 100A or data terminal 200B by controlling communications functions of the data terminal 200A.

It is noted that the above components are virtual software blocks implemented by program-controlled processing units (CPUs). The programs which control the processing units (CPUs) can be distributed in a recording medium such as a magnetic disk or semiconductor memory, delivered via networks, and provided otherwise. The functions of the above components are implemented as the processing units are controlled by the programs read into a memory installed on the data terminal 200A.

In the configuration of the data terminal 200A described above, when the validity of the token received by the token receiver 202 is verified, the controller 203 controls the data converter 204 and data transmitter 205 based on the arrangement described in the token, i.e., a method of data transfer, data content and format of the data to be transferred, etc.

The data converter 204 reads the content data requested by the data terminal 200B out of the data store 201 under the control of the controller 203. Then, it processes the content data to reflect the data format and necessary restrictions specified in the token and passes the processed content data to the data transmitter 205. The data transmitter 205 transmits the content data received from the data converter 204 to the data terminal 200B under the control of the controller 203.

The operation terminal 100B of User B comprises a negotiator 111 for negotiating an arrangement with the operation terminal 100A about transfer of content data, a token receiver 112 which receives tokens from the operation terminal 100A, a token transmitter 113 which transmits the received token to the data terminal 200B, and a data receiver 114 for receiving content data from the data terminal 200B. These components communicate with the operation terminal 100A or data terminal 200B by controlling communications functions of the operation terminal 100B. The operation terminal 100B comprises an output unit (such as a liquid-crystal display: not shown). By controlling its own output device, the operation terminal 100B outputs the content acquired from the data terminal 200A and sent from the data terminal 200B.

It is noted that the above components are virtual software blocks implemented by program-controlled processing units (CPUs). The programs which control the processing units (CPUs) can be distributed in a recording medium such as a magnetic disk or semiconductor memory, delivered via networks, and provided otherwise. The functions of the above components are implemented as the processing units are controlled by the programs read into a memory installed on the operation terminal 100B.

The data terminal 200B of User B comprises a data store 211 which stores content data, a token receiver 212 and token transmitter 213 for gaining access to the data terminal 200A using the token sent from the operation terminal 100B, a data receiver 214 which receives content data from the data terminal 200A and stores it in the data store 211, a data converter 215 which reads desired content data from the data store 211 and processes it for use in the operation terminal 100B, a data transmitter 216 which transmits content data processed by the data converter 215 to the operation terminal 100B, and a controller 217 which controls the above functions.

It is noted that the above components are virtual software blocks implemented by program-controlled processing units (CPUs). The programs which control the processing units (CPUs) can be distributed in a recording medium such as a magnetic disk or semiconductor memory, delivered via networks, and provided otherwise. The functions of the above components are implemented as the processing units are controlled by the programs read into a memory installed on the data terminal 200B.

In the configuration of the data terminal 200B described above, when the token sent from the operation terminal 100B is received by the token receiver 212, the token transmitter 213 uses this token to request the data terminal 200A to transmit the content data described in the token, under the control of the controller 217. When the desired content data is sent from the data terminal 200A in response to this request, the data receiver 214 receives and stores it in the data store 211. Then, under the control of the controller 217, the data converter 215 reads the desired content data from the data store 211, processes it properly according to the capability of the operation terminal 100B, and transmits it to the operation terminal 100B via the data transmitter 216.

Incidentally, in the example described above, it has been assumed for the sake of convenience that User A provides content while User B acquires the content, but there may be cases in which User B provides content and User A or another user acquires the content. Therefore, in the data communications system according to this embodiment, the operation terminal 100 have the configurations of both operation terminals 100A and 100B while the data terminal 200 have the configurations of both data terminals 200A and 200B.

Although the system configuration in which each user has an operation terminal 100 and data terminal 200 is typical of this embodiment, other configurations are also possible: for example, multiple operation terminals 100 may share a single data terminal 200 or conversely a user may use multiple data terminals 200 for a single operation terminal 100. Such variations will be described below.

Figure 4:
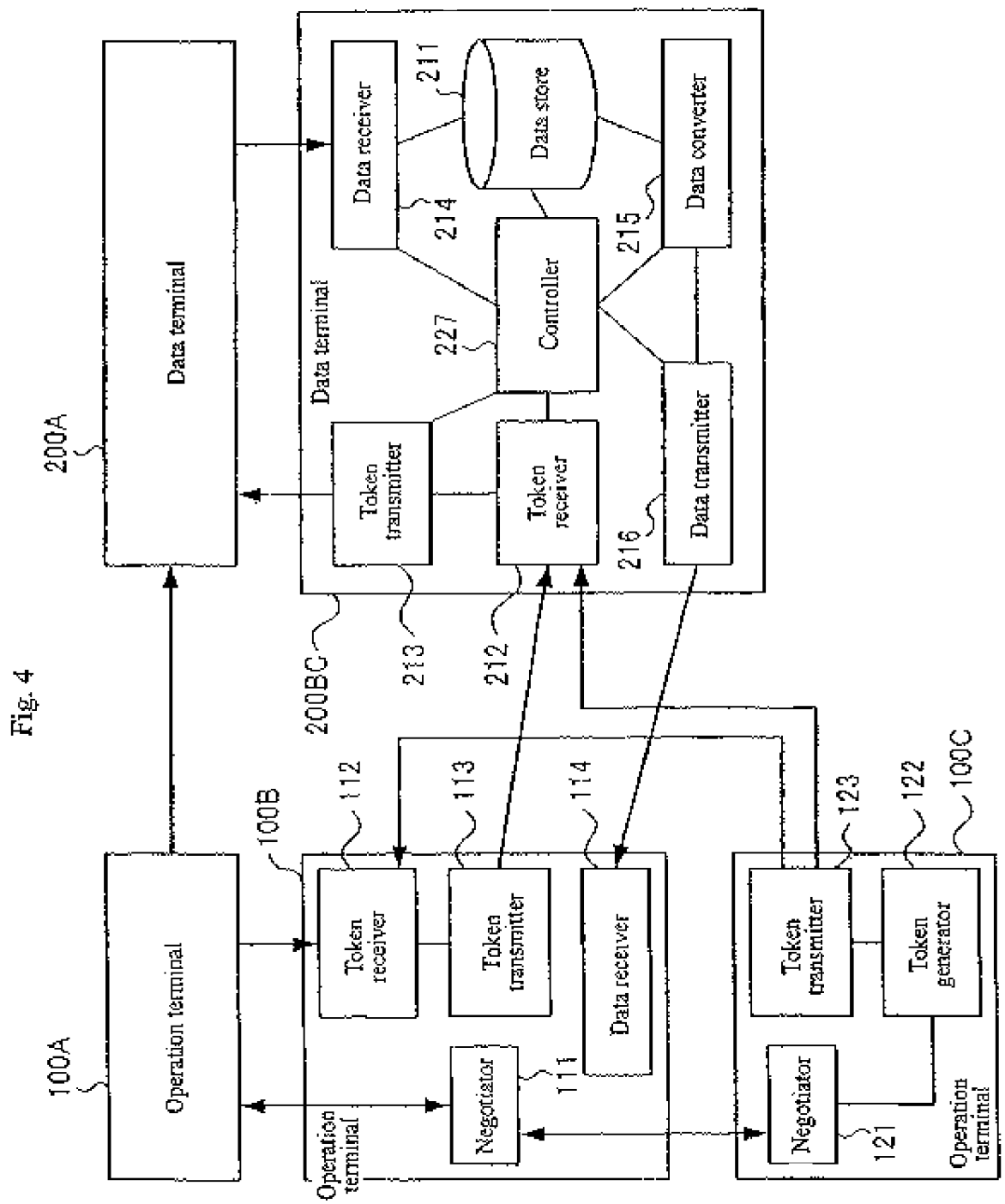
FIG. 4 is a diagram showing a system configuration according to this embodiment in the case where multiple operation terminals share a single data terminal.

FIG. 4 is a diagram showing a system configuration in which multiple operation terminals 100 share a single data terminal 200. In FIG. 4, an operation terminal 100A and data terminal 200A used by User A are the same as the operation terminal 100A and data terminal 200A shown in FIG. 3. Also, an operation terminal 100B used by User B is the same as the operation terminal 100B shown in FIG. 3.

In the configuration shown in FIG. 4, there also exists an operation terminal 100C used by User C who provides content to User B. User C shares a data terminal 200 with User B. The data terminal 200 shared by User B and User C will be denoted hereinafter as the data terminal 200BC with a suffix "BC."

As shown in FIG. 4, the operation terminal 100C comprises the following components as functions for providing content. Namely, as is the case with the operation terminal 100A, it comprises a negotiator 121 for negotiating an arrangement with the operation terminal 100B of User B about transfer of content data, a token generator 122 which generates a token, and a token transmitter 123 which transmits the generated token to the operation terminal 100B and data terminal 200BC. The negotiator 121 and token transmitter 123 communicate with the operation terminal 100B or data terminal 200BC by controlling the communications functions of the operation terminal 100A.

Incidentally, as is the case with the operation terminals 100A and 100B, the above components are virtual software blocks implemented by program-controlled processing units (CPUs). The programs which control the processing units (CPUs) can be distributed in a recording medium such as a magnetic disk or semiconductor memory, delivered via networks, and provided otherwise. The functions of the above components are implemented as the processing units are controlled by the programs read into a memory installed on the operation terminal 100A.

As is the case with the data terminal 200B shown in FIG. 3, the data terminal 200BC comprises a data store 211, token receiver 212, token transmitter 213, data receiver 214, data converter 215, and data transmitter 216 as well as a controller 227 which has the same functions as the controller 217 of the data terminal 200B and controls the transfer of content from User C to User B. The data store 211 stores the content data owned by User B and the content data owned by User C.

Under the control of the controller 227, the token receiver 212 receives the token generated by the operation terminal 100C from the operation terminal 100B of User B who is to be provided with content as well as from the operation terminal 100C. This corresponds to the process of sending a token from the operation terminal 100A to the data terminal 200A.

The controller 227 checks the validity of the token received from the operation terminal 100B against the token received from the operation terminal 100A. If the validity of the token is verified, the appropriate content data owned by User C and stored in the data store 211 is saved as content data owned by User B based on the arrangement described in the token, i.e., a method of data transfer, data content and format of the data to be transferred, etc. Meanwhile, the data converter 215 processes the content data, as required, based on the description included in the token. This is simply a matter of duplicating User C's content data and storing it as User B's content data in the data store 211. There is no need for data communications unlike in the case of content data transmission from the data terminal 200A to the data terminal 200BC.

If the data store 211 stores content data by managing data substance and access rights separately, the transfer of the content data can be completed by simply giving User B the access rights to User C's content data according to the arrangement indicated by the token without duplicating the substance of the content data.

Figure 5:
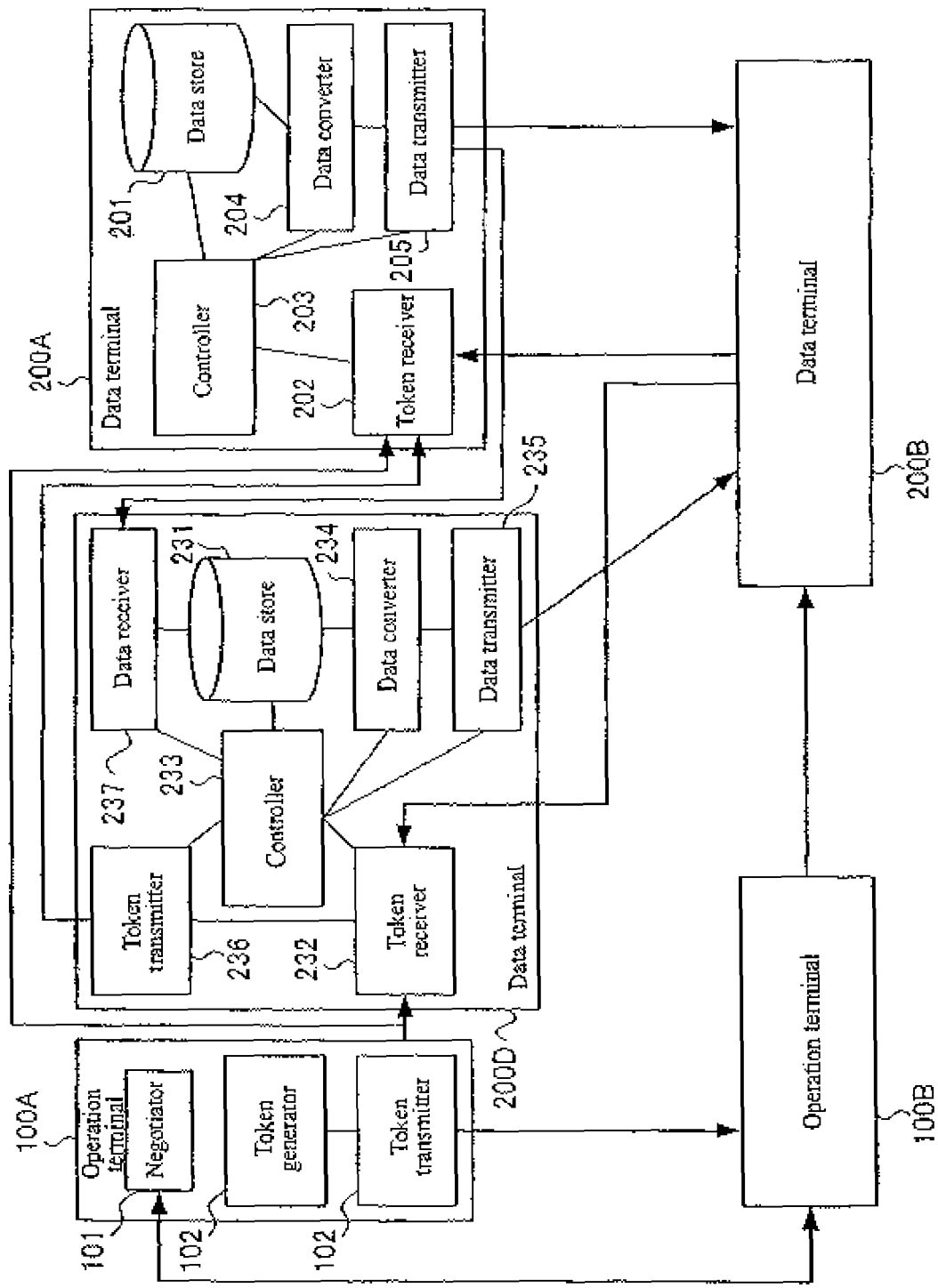
FIG. 5 is a diagram showing a system configuration according to this embodiment in the case where a user uses multiple data terminals for a single operation terminal.

FIG. 5 is a diagram showing a system configuration in which a user uses multiple data terminals 200 for a single operation terminal 100.

In FIG. 5, an operation terminal 100B and data terminal 200B used by User B are the same as the operation terminal 100B and data terminal 200B shown in FIG. 3. Also, an operation terminal 100A used by User A is the same as the operation terminal 100A shown in FIGS. 3 and 4. In the configuration shown in FIG. 5, User A uses two data terminals 200A and 200D for the operation terminal 100A.

As shown in FIG. 5, the data terminal 200D comprises the following components as functions for storing content data. Namely, as is the case with the data terminal 200A, it comprises a data store 231 which stores content data, a token receiver 232 which receives tokens from the operation terminal 100A and data terminal 200B, a controller 233 which verifies the validity of the received tokens and controls transmission of content data according to the arrangement described in the tokens, and a data converter 234 and data transmitter 235 which read desired content data from the data store 231 and transmit it to the data terminal 200B under the control of the controller 233. It also comprises a token transmitter 236 and a data receiver 237 for exchanging data with the data terminal 200A. The token receiver 232, data transmitter 235, token transmitter 236, and data receiver 237 communicate with the operation terminal 100A, data terminal 200A, or data terminal 200B by controlling communications functions of the data terminal 200D.

The above components are virtual software blocks implemented by program-controlled processing units (CPUs). The programs which control the processing units (CPUs) can be distributed in a recording medium such as a magnetic disk or semiconductor memory, delivered via networks, and provided otherwise. The functions of the above components are implemented as the processing units are controlled by the programs read into a memory installed on the data terminal 200D.

In the configuration of the data terminal 200D described above, when the validity of the token received by the token receiver 232 is verified, the controller 233 controls the data converter 234 and data transmitter 235 based on the arrangement described in the token, i.e., a method of data transfer, data content and format of the data to be transferred, etc. The data converter 234 reads the content data requested by the data terminal 200B out of the data store 231 under the control of the controller 233. Then, it processes the content data to reflect the data format and necessary restrictions specified in the token and passes the processed content data to the data transmitter 235. The data transmitter 235 transmits the content data received from the data converter 234 to the data terminal 200B under the control of the controller 233.

Therefore, if all the content data to be transmitted to the data terminal 200B is stored either in the data store 231 of the data terminal 200D or data store 201 of the data terminal 200A, the operation of transferring the content data is the same in either case and the only difference is whether the data content is transferred from the data terminal 200A or data terminal 200D. However, with a configuration such as the one shown in FIG. 5, User A may divide and store the content data in the data store 231 of the data terminal 200D and data store 201 of the data terminal 200A.

If the content data to be transmitted is divided between the data store 231 of the data terminal 200D and data store 201 of the data terminal 200A, User A transmits the token from the operation terminal 100A to both data terminal 200A and data terminal 200D in Communication 3 shown in FIG. 2. It is assumed here that the token sent from the data terminal 200B to gain access to the content data is received by the token receiver 232 of the data terminal 200D. The controller 233 verifies the validity of the token received by the token receiver 232, and then controls the token transmitter 236 so as to pass the token to the data terminal 200A.

When the token receiver 202 of the data terminal 200A receives the token from the data terminal 200D, the controller 203 verifies the validity of the token and controls the data converter 204 and data transmitter 205. Then, the data converter 204 reads the content data specified in the token out of the data store 201 and the data transmitter 205 passes the content data read by the data converter 204 to the data terminal 200D. The content data is received by the data receiver 237 of the data terminal 200D and stored in the data store 231.

Subsequently, the controller 233 controls the data converter 234 to combine the data stored in the data store 231 and the data received from the data terminal 200A via the data receiver 237 into the complete content data described in the token and process the content data according to the arrangement described in the token. Then, under the control of the controller 233, the data transmitter 235 transmits the content data to the data terminal 200B.

It is noted that in the above example, it has been assumed that when the content data to be transmitted is divided between the data store 231 of the data terminal 200D and data store 201 of the data terminal 200A, the token for gaining access to the content data is sent from the data terminal 200B to the data terminal 200D, but the token may be sent to both data terminals 200D and 200A. Besides, it is also possible to install the token transmitter 236 and data receiver 237 both on the data terminals 200D and 200A so that the content data will be synthesized when one of the data terminals receives the token.

Basically, this embodiment involves making an arrangement about content transfer and setting access rights on the operation terminal 100 and transferring content data on the data terminal 200 based on the access rights. However, together with the content data transferred, a user may want to send data prepared on the operation terminal 100. For example, data used frequently by the user (to annotate content) may be held in the operation terminal 100 carried by the user and the user may want to include this data in transmitted data. This requires a mechanism for passing the data held in the operation terminal 100 to the data terminal 200.

Figure 6:
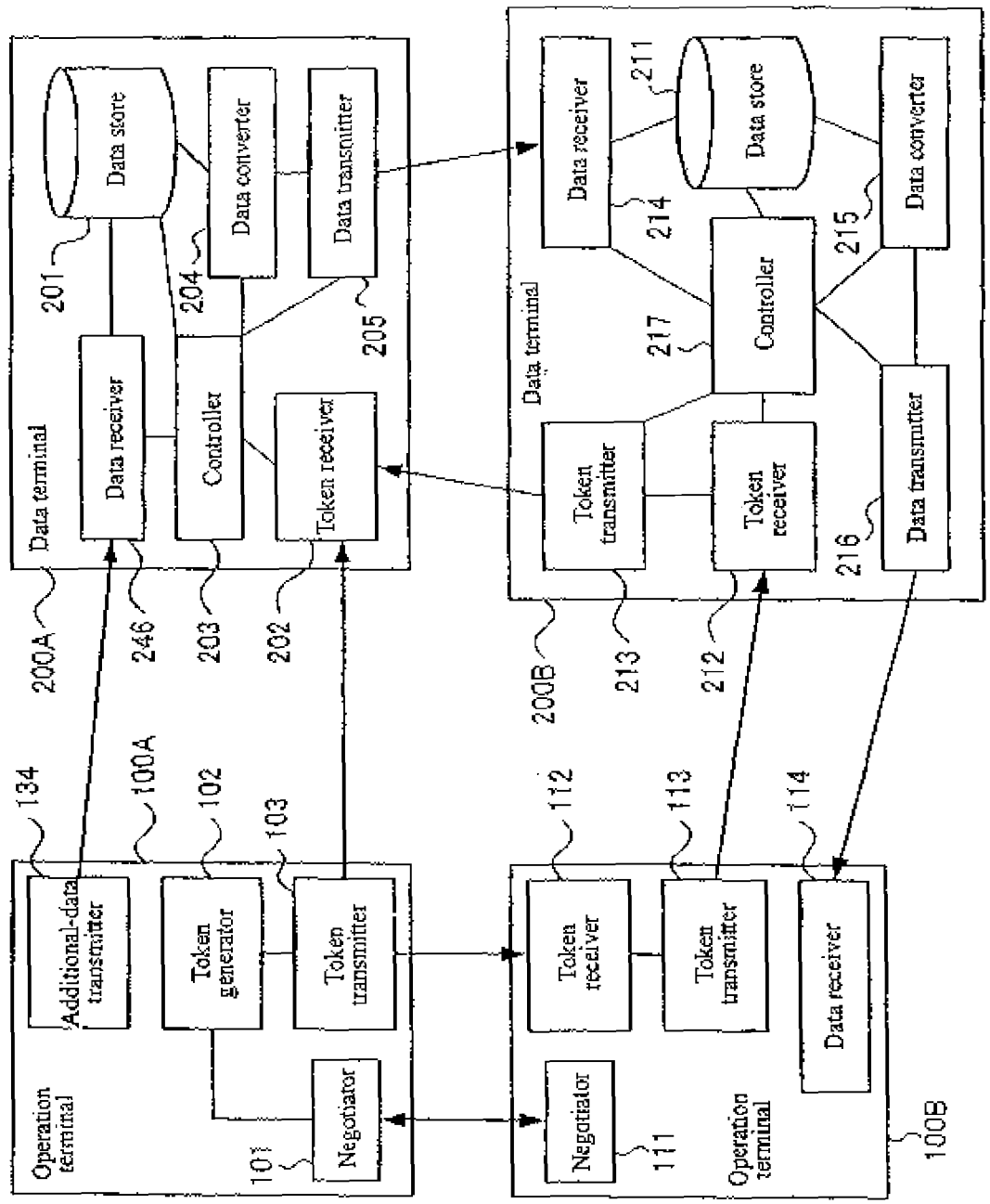
FIG. 6 is a diagram showing a system configuration according to this embodiment which makes it possible to transmit additional data by attaching it to content data.

FIG. 6 is a diagram showing a system configuration which allows data (hereinafter referred to as additional data) held in the operation terminal 100A of User A to be transmitted by attaching it to offered content data. In FIG. 6, an operation terminal 100B and data terminal 200B used by User B is the same as the operation terminal 100B and data terminal 200B shown in FIG. 3.

As shown in FIG. 6, in addition to the negotiator 101, token generator 102, and token transmitter 103, the operation terminal 100A comprises an additional-data transmitter 134 for transmitting additional data stored in memory to the data terminal 200A. Like the negotiator 101 and token transmitter 103, the additional-data transmitter 134 communicates with the data terminal 200A by controlling the communications functions of the operation terminal 100A. The additional-data transmitter 134 can transmit the additional data at any time. For example, the additional data may be transmitted at the same time as the token transmitter 103 transmits the token to the data terminal 200A.

Incidentally, the additional-data transmitter 134 is a virtual software block implemented by a program-controlled processing unit (CPU), as is the case with other components. On the other hand, the data terminal 200A comprises a data receiver 246 which receives the additional data from the operation terminal 100A and stores it in the data store 201, in addition to comprising the data store 201, token receiver 202, controller 203, data converter 204, and data transmitter 205. Like the token receiver 202 and data transmitter 205, the data receiver 246 communicates with the operation terminal 100A by controlling the communications functions of the data terminal 200A. The additional data stored in the data store 201 by the data receiver 246 is attached to the content data, for transmission to the data terminal 200B, according to description in the token and the like when the content data is read by the data converter 204. Besides, this embodiment can be used as a content sales system if combined with a public key system and payment system.

Figure 7:
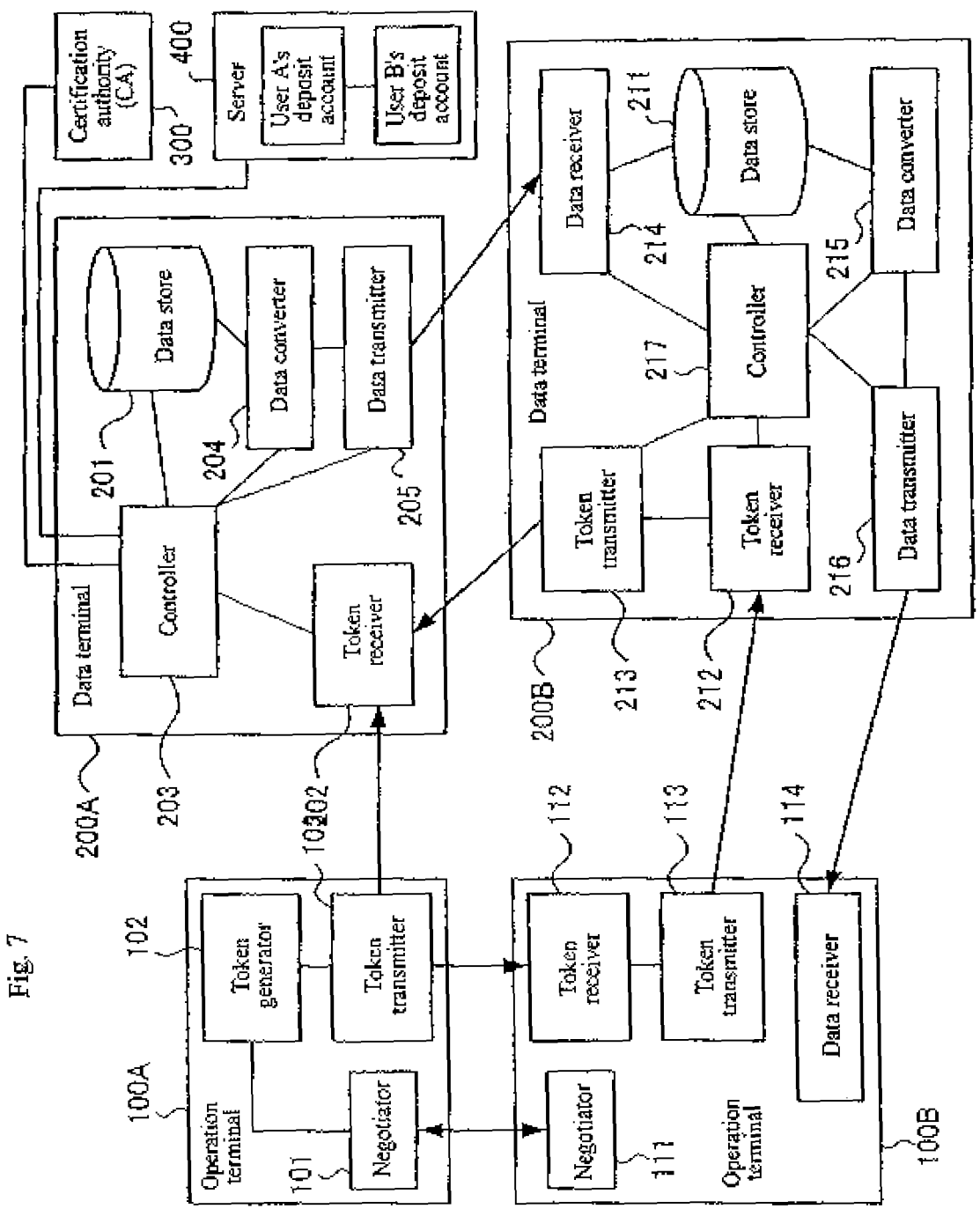
FIG. 7 is a diagram showing a configuration which combines the data communications system according to this embodiment with a public key system and payment system.

FIG. 7 is a diagram showing a configuration which combines the data communications system according to this embodiment with a public key system and payment system. As shown in FIG. 7, in addition to the operation terminal 100 and data terminal 200, this system comprises a certification authority (CA) 300 which certifies public keys and a server 400 which provides payment system services. It is assumed that any user who uses this system should have obtained a set of a valid private key and public key for his/her own use from the certification authority 300.

In this system, together with an arrangement about transfer of content, an arrangement about the selling price of the content is made between the operation terminals 100A and 100B. Then, a document (data) bearing a digital signature and certifying that the content will be purchased is sent from the operation terminal 100B to the operation terminal 100A. Also, a document (data) bearing a digital signature and certifying that the content will be sold is sent from the operation terminal 100A to the operation terminal 100B. These documents (data) are sent to the respective data terminals 200A and 200B along with the token.

When authenticating the token sent from the data terminal 200B, the controller 203 of the data terminal 200A acquires the public key of User B from the certification authority 300, as required, to check the validity of the signature. Also, the controller 203 sends the server 400 the document bearing a digital signature and certifying that the User B will purchase the content. The server 400 performs data processing to transfer the amount payable from a User A's deposit account to a User B's deposit account according to the document which describes the trading of the content.

Although the data terminal 200 described above may be implemented as a constantly connected server managed privately by the user, it may also be implemented by hosting services or PIM (Personal Information Manager) services provided by a designated server on a network. Therefore, it may be implemented in any of various forms depending on the user's knowledge and expertise in network systems and computers, the use form of the data system of this embodiment, budgets, etc.

Also, according to the above embodiment, a token is used to assign access rights to allow access to the content data held by the data terminal 200, but there is no need to stick to this technique. For example, it is also possible to grant registered users access rights to designated databases and operate the system in such a way as to allow the data terminal 200 of the registered users to acquire content freely.

Furthermore, according to the above embodiment, the operation terminal 100 is a portable terminal such as a PDA, but it is also possible to use a desktop computer or other computer with sufficient capability. Even if content is transferred using a portable terminal as the operation terminal 100, content data of desired quality can be sent to the data terminal 200. Therefore, if a desktop computer or other computer with sufficient capability is used for using content data, content of high quality is available accordingly.

As described above, the present invention allows large volumes of content (data) to be exchanged efficiently through network connections using portable terminals. The present invention also allows large volumes of data to be exchanged without the need for a portable terminal to maintain a network connection for a long time. Furthermore, the present invention can exchange large volumes of data and output data which has been processed properly according to the functionality of the output device.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

I claim:

1. A data communications system, comprising:
a first data storage terminal to store certain data; and
a control terminal to control access rights to said data stored in said first data storage terminal,
wherein said control terminal connects to another terminal via a network and grants said another terminal access rights to said data, and
said first data storage terminal returns said data to a second storage terminal according to an access request which is made based on the access rights granted to said another terminal by said control terminal.

2. The data communications system according to claim 1, wherein said first data storage terminal transmits said data to said second storage terminal of an access requester via a wired network.

3. A data communications system comprising:
an operation terminal to make an arrangement about transfer of data held by a designated terminal in a designated data storage terminal and acquires access rights to the data based on the arrangement; and
a data acquisition terminal to acquire from said designated data storage terminal the data held by said designated terminal by making a data access request to said designated terminal via a network based on said access rights acquired by said operation terminal.

4. The data communications system according to claim 3, wherein:
said data acquisition terminal processes said data according to a capability of said operation terminal forming processed data and transmits the processed data to the operation terminal; and
said operation terminal receives and uses the processed data sent from said data acquisition terminal.

5. The data communications system according to claim 3, wherein said data acquisition terminal acquires said data from said designated data storage terminal via a wired network.

6. A data communications method, comprising the steps of:
making an arrangement between a control terminal and another terminal via a wireless network about transfer of designated data between a first data storage terminal and a second data storage terminal;
assigning access rights to the data to said another terminal based on the arrangement; and
transferring said data between said first data storage terminal and said second data storage terminal over a wired network based on the access rights.

7. An article of manufacture tangibly embodying non-transitory computer readable instructions which when implemented cause a computer to carry out the steps of a data communications method, the method comprising the steps of:
making an arrangement between a control terminal and another terminal via a wireless network about transfer of designated data between a first data storage terminal and a second data storage terminal;
assigning access rights to the data to said another terminal based on the arrangement; and
transferring said data between said first data storage terminal and said second data storage terminal over a wired network based on the access rights.

* * * * *